US006907397B2

(12) United States Patent
Kryze et al.

(10) Patent No.: US 6,907,397 B2
(45) Date of Patent: Jun. 14, 2005

(54) SYSTEM AND METHOD OF MEDIA FILE ACCESS AND RETRIEVAL USING SPEECH RECOGNITION

(75) Inventors: David Kryze, Santa Barbara, CA (US); Luca Rigazio, Santa Barbara, CA (US); Patrick Nguyen, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 58 days.

(21) Appl. No.: 10/245,727

(22) Filed: Sep. 16, 2002

(65) Prior Publication Data
US 2004/0054541 A1 Mar. 18, 2004

(51) Int. Cl.[7] .............................................. G10L 15/04
(52) U.S. Cl. ...................... 704/251; 704/201; 704/270; 704/270.1; 704/257; 707/3; 707/4; 707/5; 706/49; 706/55; 706/62
(58) Field of Search ............................. 704/270, 270.1, 704/275, 257, 231, 251, 272, 260, 201, 235; 707/3, 4, 5; 706/49, 55, 62; 379/88.01

(56) References Cited

U.S. PATENT DOCUMENTS

| | | | | |
|---|---|---|---|---|
| 5,619,718 A | * | 4/1997 | Correa | 704/9 |
| 5,758,322 A | * | 5/1998 | Rongley | 704/275 |
| 5,995,918 A | * | 11/1999 | Kendall et al. | 704/1 |
| 6,334,102 B1 | * | 12/2001 | Lewis et al. | 704/255 |
| 6,434,524 B1 | * | 8/2002 | Weber | 704/257 |
| 6,434,529 B1 | * | 8/2002 | Walker et al. | 704/275 |
| 6,532,444 B1 | * | 3/2003 | Weber | 704/257 |

* cited by examiner

Primary Examiner—Vijay Chawan
(74) Attorney, Agent, or Firm—Harness, Dickey & Pierce, PLC (57) ABSTRACT

An embedded device for playing media files is capable of generating a play list of media files based on input speech from a user. It includes an indexer generating a plurality of speech recognition grammars. According to one aspect of the invention, the indexer generates speech recognition grammars based on contents of a media file header of the media file. According to another aspect of the invention, the indexer generates speech recognition grammars based on categories in a file path for retrieving the media file to a user location. When a speech recognizer receives an input speech from a user while in a selection mode, a media file selector compares the input speech received while in the selection mode to the plurality of speech recognition grammars, thereby selecting the media file.

34 Claims, 5 Drawing Sheets

SYSTEM AND METHOD OF MEDIA FILE ACCESS AND RETRIEVAL USING SPEECH RECOGNITION

FIELD OF THE INVENTION

The present invention generally relates to index and retrieval methods and systems, and particularly relates to selection of a media file based on a textual description of the file using speech recognition.

BACKGROUND OF THE INVENTION

Embedded devices for playing media files, such as MP3 players, suffer from limited display and manual input capability. For example, where displays are provided, they are small of necessity due to limited space and are thus incapable of displaying a large amount of information. Also, function keys provided are of small number due to limited space, such that full textual input is difficult and often impossible. As a result, the tasks of finding, storing, and retrieving MP3 files are laborious and often frustrating processes for users to perform. For these and similar reasons, embedded devices have been developed that use speech recognition to access databases of various kinds.

The implementation of speech recognition with embedded devices has unfortunately failed to conceive of speech recognition as more than just another input in the human-machine interaction paradigm centered around buttons, jog dials, and touch screens. The previous implementations, thus, treat speech input as another command for navigating a menu in the same way as using a function or jog dial. The need remains, therefore, for an embedded device that accesses information in a manner that is centered around speech recognition and speech recognition technologies. The present invention provides such a device.

SUMMARY OF THE INVENTION

According to the present invention, an embedded device for playing media files is capable of generating a play list of media files based on input speech from a user. It includes an indexer generating a plurality of speech recognition grammars. According to one aspect of the invention, the indexer generates speech recognition grammars based on contents of a media file header of the media file. According to another aspect of the invention, the indexer generates speech recognition grammars based on categories in a file path for retrieving the media file from a user location. When a speech recognizer receives an input speech from a user while in a selection mode, a media file selector compares the input speech received while in the selection mode to the plurality of speech recognition grammars, thereby selecting the media file.

The embedded device according to the present invention is advantageous over previous media file players in that users can select media files by speech input without the requiring extensive effort on the part of a user to generate an indexing system for retrieving the file. The present invention is particularly advantageous for playing sound files in an MP3 format, and for playing music files in particular, where the file header usually contains descriptive text (such as title, artist, date), that is highly useful in creating speech recognition grammars that are likely to assist in a speech driven search in a manner that is intuitive to users. The present invention, however, is not limited to music files or sound files in an MP3 format, but is useful for selecting media files of various types of content, different formats, and multiple layers. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
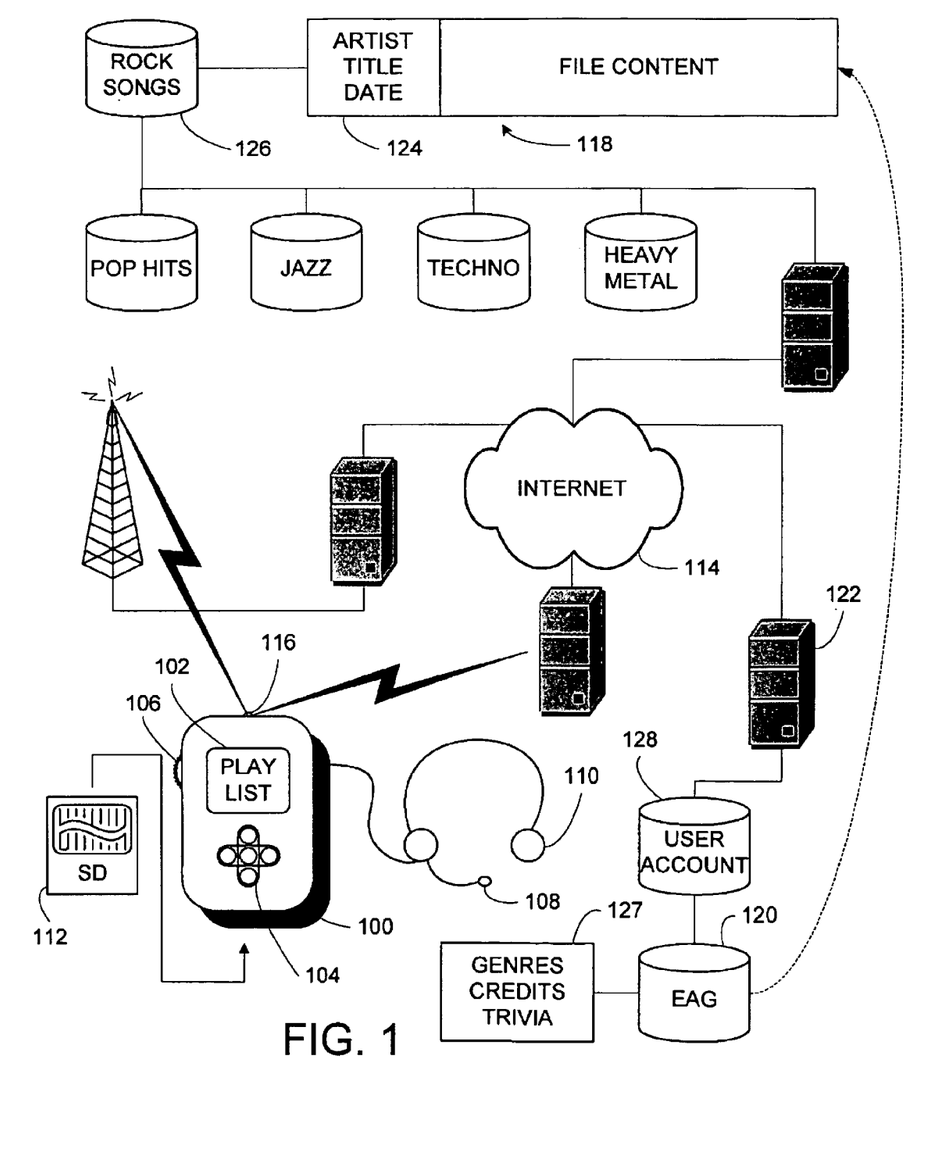
FIG. 1 is a partial perspective block diagram depicting an embedded device accessing media files over a computer network according to the present invention.

In accordance with the present invention and with reference to FIG. 1, an embedded device 100 has a limited display 102 for viewing a play list, and a multifunction action button 104. A jog dial 106 is also provided, along with an audio input 108 and an audio output 110. A data store 112, such as a Secure Digital (SD) card is also provided. The embedded device 100 is able to access a computer network 114, such as the Internet, using a data link 116, such as wireless or Bluetooth.

In operation, a user browses the computer network 114 using speech input and/or manual input, and locates a media file 118 of interest. The user may, in one example, download the media file 118 to the data store 112 for future access at leisure. In another example, the user may determine availability of streaming media comprising the media file on the computer network using, for example, an Electronic Activity Guide (EAG) 120 provided by a proprietary server 122. The user may choose to save information for issuing a stream request to receive the media file 118 as streaming media.

In accordance with the present invention, an index is created for retrieving the media file that includes speech recognition grammars generated from contents of the media file header 124, descriptive text from a file path leading to the media file over the computer network, such as the name of a database 126 descriptively categorizing its contents, and/or supplemental information 127, such as genre, credits (song writers, band members, producers), and/or or trivia (video shoot location, country of origin, types of musical instruments) provided, for example, by EAG 120. A user can further enter voice bindings to describe the media file in a way meaningful to the user. Still further, speech recognition performed on contents of media files containing speech yields text for generating speech recognition grammars.

According to various alternative implementations and or circumstances of use, the index thus created can be stored in the data store 112, in a use account database 128 of the proprietary server 122, and/or on a local server 130. The user can thereafter select the media file by inputting speech during a selection mode. A speech recognizer of the embedded device 100 recognizes the speech by generating a plurality of speech recognition hypotheses, and these hypotheses are compared to the recognition grammars of the index to select the media file. If needed, some or all of the speech recognition hypotheses can be communicated to the local server 130 and/or the proprietary server 122 so that the comparison can take place at the appropriate location.

Figure 2:
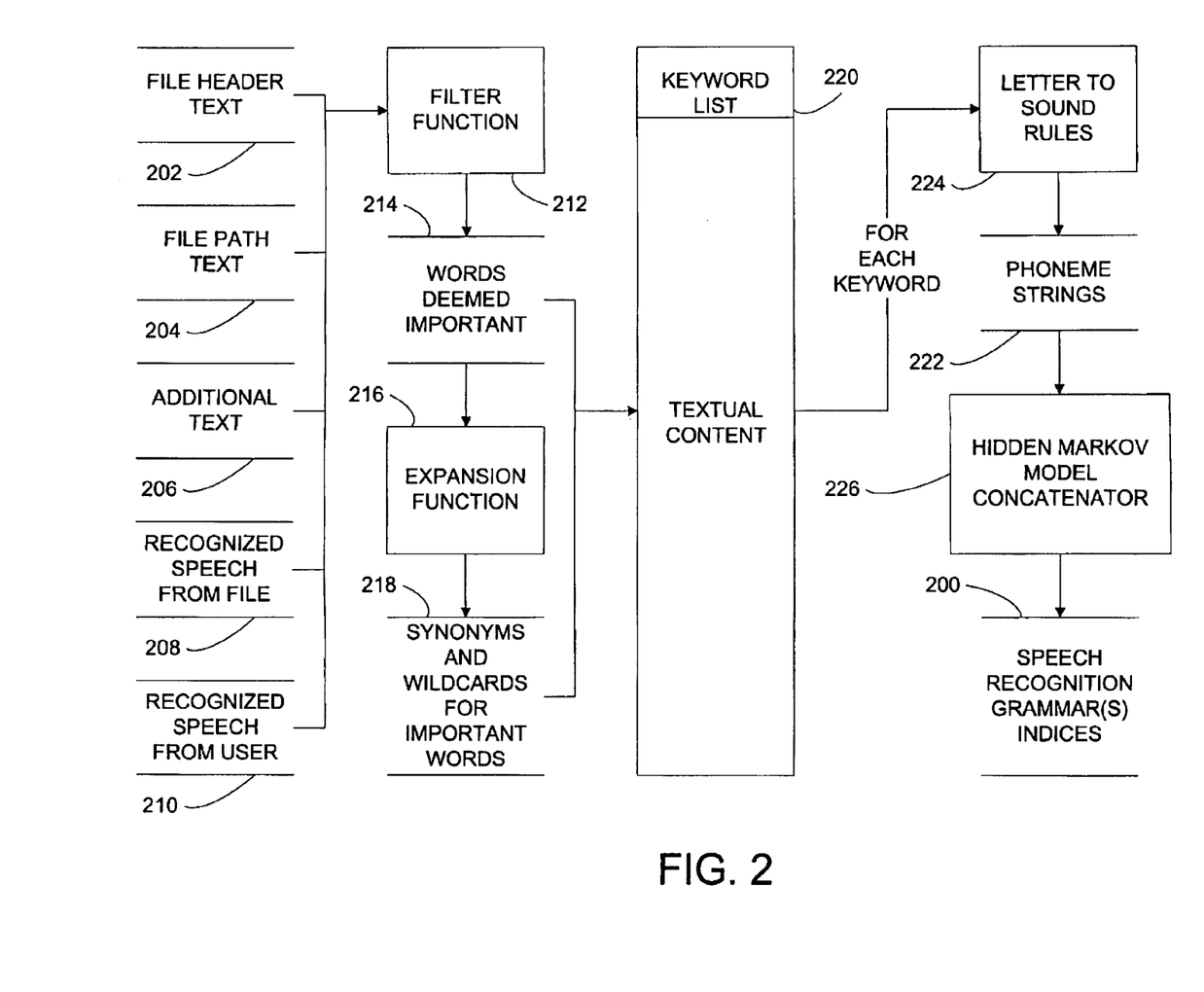
FIG. 2 is a data flow diagram depicting a method of generating grammars for indexing media files according to the present invention.

The data flow diagram of FIG. 2 depicts generation of speech recognition grammar indices 200 according to the present invention. Therein, descriptive text describing the contents of the media file is extracted from a variety of sources. For example, text from a file header of the located media file 202 is extracted, and descriptive text from a file path leading to the media file over the computer network 204 is also extracted. Further, additional text 206 from a supplemental source, such as an EAG, is extracted. Still further, recognized speech from the contents of the media file 208 is extracted, if present, and recognized speech from a user 210 is similarly used. The descriptive text thus obtained is communicated to a filter function 212.

Filter function 212 filters the obtained descriptive text by discarding words of low value, such as prepositions in a song title, and contents of a file path that do not comprise words. Thus, words that are deemed important 214 are communicated to an expansion function 216 that generates synonyms, and/or truncated versions (useful as wildcards) 218 of the important words. For example, the deemed important word "sadly" may be expanded into synonyms "unhappily", "miserably," and/or truncated to "sad". The truncation "sad" may further be expanded into synonyms to produce "unhappy" and "miserable". The expansions "unhappily" and/or "unhappy" may also be truncated to produce "unhap" which can be further expanded to "unhappiness".

Accordingly, a list of keywords 220 is generated based on the words deemed important 214 and/or the expansions (and/or truncations) 218 derived from the words deemed important 218. Each word in the list of keywords 220 is converted to phoneme strings 222 using letter to sound rules 224. Finally, a Hidden Markov Model (HMM) concatenator 226 generates speech recognition grammar indices 200 by concatenating the phoneme strings 222, and the media file is indexed by the generated speech recognition grammar indices 200.

Figure 3A:
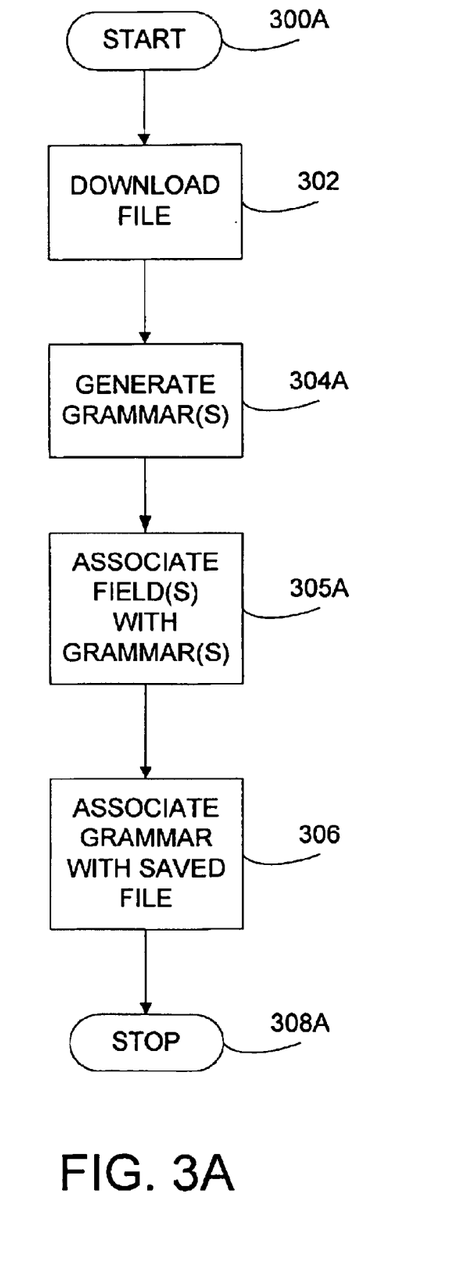
FIGS. 3A and 3B are flow diagrams illustrating alternative methods of indexing media files according to the present invention.
Figure 3B:
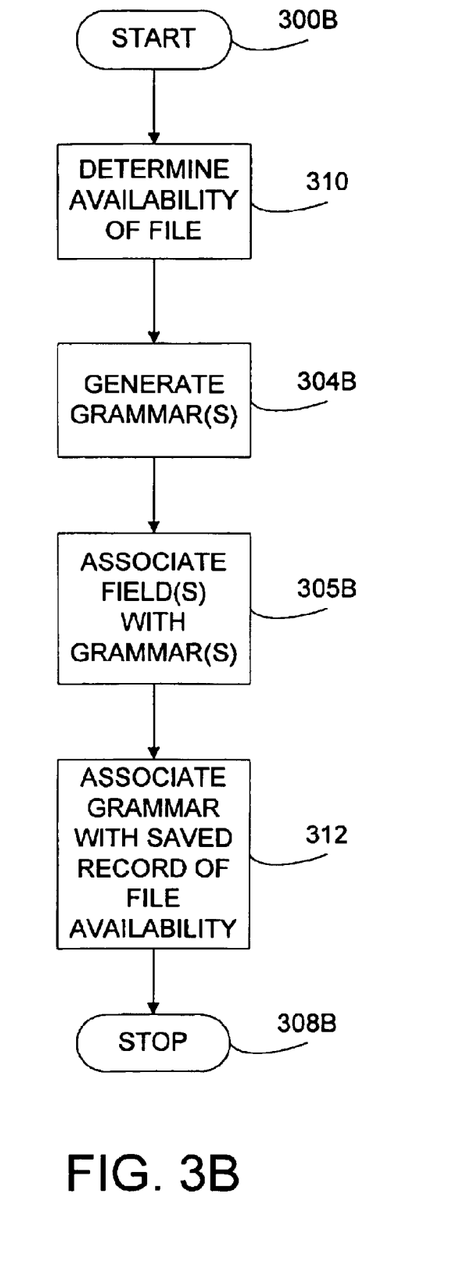

FIGS. 3A and 3B are flow diagrams illustrating alternative methods of indexing media files using speech recognition grammars according to the present invention. For example, according to a first alternative starting at 300A, a media file is downloaded at 302. Speech recognition grammar indices are generated at 304A based on the downloaded media file according to the method of FIG. 2. A field type is further generated and associated with the generated grammar as metadata at 305A. The downloaded media file is stored in a data store at 306, such as data store 112 (FIG. 1), a memory of local server 130, or database 128, in association with the generated speech recognition grammar indices, and the method according to the first alternative ends at 308A. Further, according to a second alternative starting at 300B, availability of a media file on the computer network is determined at 310, and speech recognition grammar indices are generated at 304B based on the available media file according to the method of FIG. 2. A field type is further generated and associated with the generated grammar as metadata at 305B. A record of availability of the file is stored in a data store at 312, such as data store 112 (FIG. 1), a memory of local server 130, or database 128, in association with the generated speech recognition grammar indices, and the method according to the second alternative ends at 308B (FIG. 3B).

Figure 4:
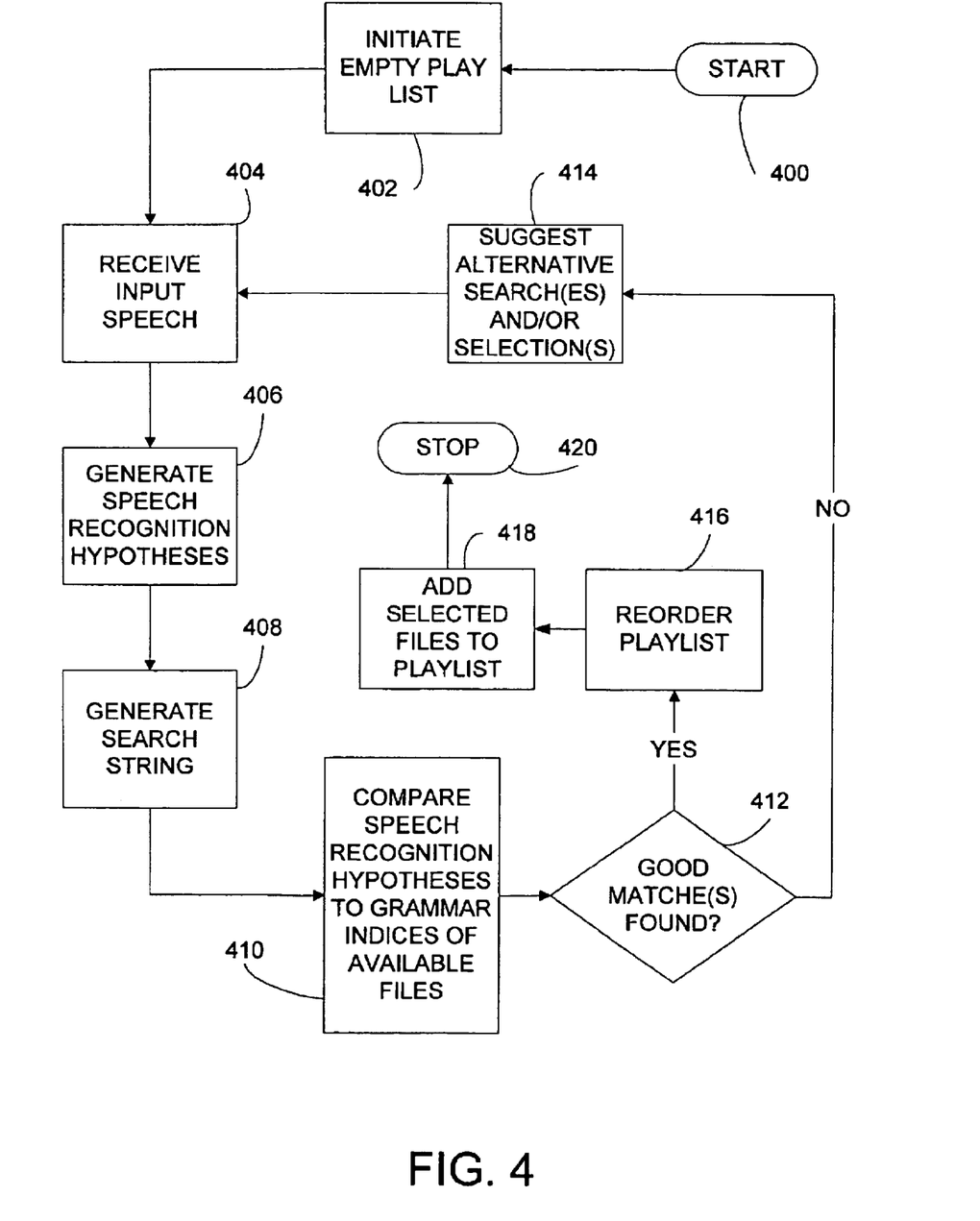
FIG. 4 is a flow diagram depicting a method of generating a temporary play list according to the present invention.

The present invention facilitates user play of multiple media files using the embedded device, and FIG. 4 illustrates a method of creating a temporary play list according to the present invention that implements a method of selecting media files according to the present invention. Therein, the method begins at 400 in response to a user's speech input to play files of a certain type. For example, if a user inputs speech corresponding to "Play all songs from U2 except album Bloody Sunday," then a selection mode is entered and a temporary play list is initiated at step 402. The rest of the speech input, "all songs from U2 except album Bloody Sunday," is received at step 404 and speech recognition hypotheses are generated at 406.

A search string is generated at step 408 based on recognition of certain keywords, such as "all songs" (designating an inclusive search of available MP3 files), "U2" (designating a first slot for a search term in the form of a plurality of speech recognition hypotheses by virtue of not being recognized as a keyword), "except" (designating a Boolean AND NOT), "album" (designating a field type associated with a subsequent search term slot), and "Bloody Sunday" (designated a second slot for a search term in the form of a plurality of speech recognition hypotheses by virtue of not being recognized as a keyword). Thus, a search string is potentially generated in the form of "all MP3 files==first slot AND NOT (<album> AND second slot)."

As a result of the aforementioned formulated search string, when speech recognition hypotheses for the non-keyword terms "U2" and "Bloody Sunday" are compared to grammar indices of available files at 410 during the selection process, available MP3 files by the artist U2 are selected that are not known to be from the album Bloody Sunday. Notably, comparison of the plurality of speech recognition hypotheses to the recognition grammars generated according to the present invention exhibit inherent "wildcard" characteristics as previously discussed, and also according to the nature of the speech recognition process. For example, a song entitled "I Love You Too" and by a different artist than U2 may also be selected based on the aforementioned query, such that it may be desirable for a user to specify the field type <artist> for the first slot. Thus, quality of the file selection is dependent to some degree on the available files and the quality of the speech input for formulating the search string.

According to the present invention, if a selection attempt at step 410 fails to find good matches as at 412, then alternative searches and/or selections are suggested to the user using generated speech at step 414, and processing returns to step 404. If, however, good matches are found as at 412, then the best matches are reordered at step 416 either randomly, by popularity, author name, by track number, or some other criteria that can be specified by the user based on preference, potentially based on keywords that are part of the speech input. Then, a number of the selected songs are added to the temporary play list at step 418. The number of matches added in this step may be determined based on user preference, where a user can set a maximum number of files to select. The selection may also be dependent on a minimum confidence score, which can also potentially be varied by a user based on preference. Again, the user preference may potentially be specified based on keywords that are part of the speech input by, for example, stating, "play the most popular five songs by the artist U2 except the album Bloody Sunday." The recognized keywords "most popular" and "five songs" would thus potentially result in selection of many songs at 410, followed by reordering of the selected songs at 416 based on popularity, and addition of the top five songs to the temporary play list at 418. Once the temporary play list is constructed, the method ends at 420 by exiting the selection mode and automatically entering a play mode based on the keyword "play" in the speech input received at step 404.

Figure 5:
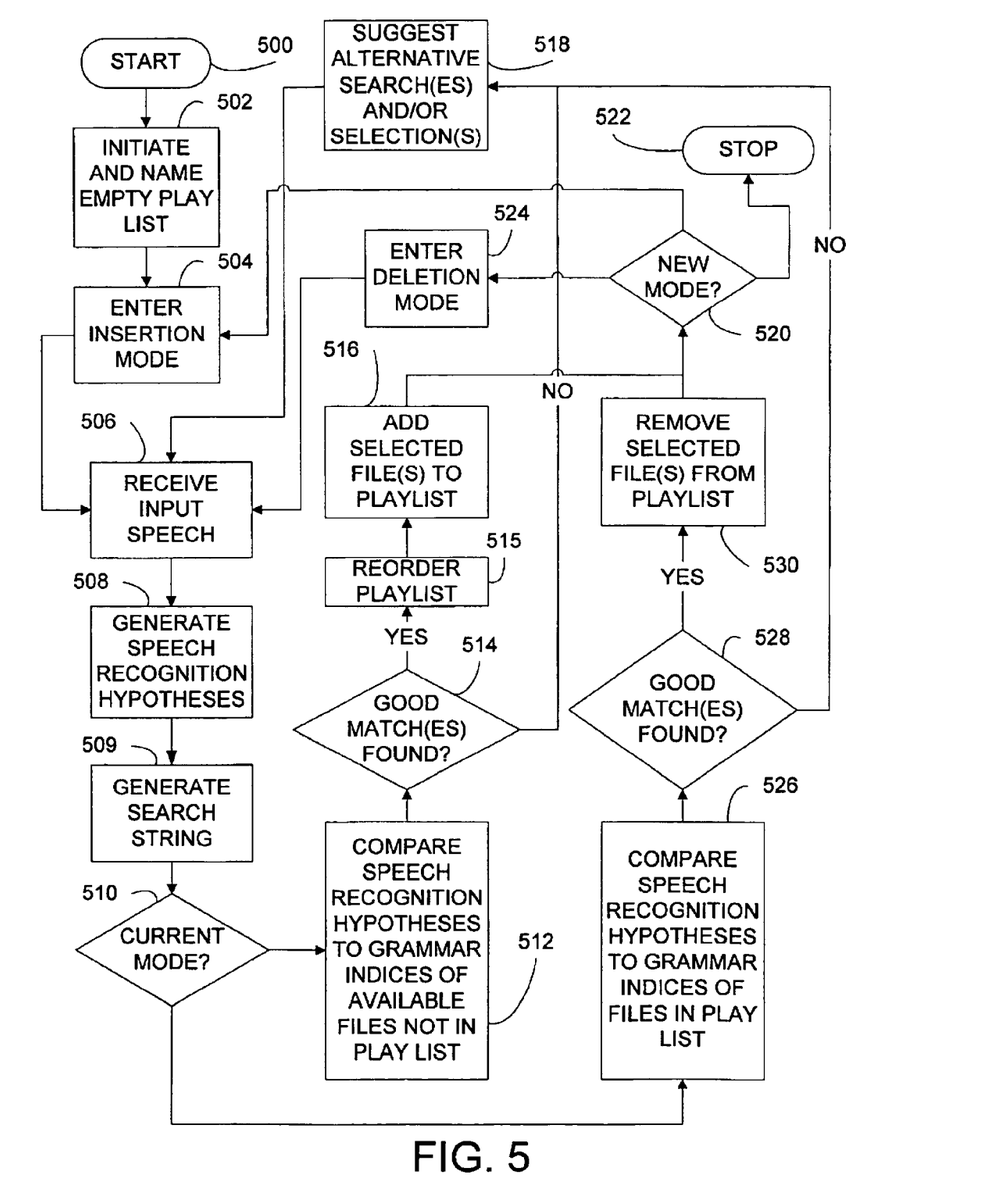
FIG. 5 is a flow diagram depicting a method of generating a stored, editable play list according to the present invention.

The present invention also facilitates user creation and/or editing of play lists of media files using the embedded device, and FIG. 5 illustrates a method of creating a stored, editable play list according to the present invention that implements a method of selecting media files according to the present invention. The method begins at 500 upon entry of a selection mode corresponding to a play list generation mode. Therein, the method proceeds to step 502, wherein an empty play list is initiated and named via user speech input. In one sense, the name of the play list constitutes a voice binding by which users can retrieve a plurality of media files. Thus, when a user names a play list "My Favorite Sad Songs", then a voice binding is created for all songs placed into the list by which the entire list can be retrieved and played at will.

With the empty list ready to receive media files, the method enters an insertion mode at 504, and then proceeds to receive input speech at 506. Speech recognition hypotheses are generated at 508 using a speech recognizer, and a search string is generated at 509 based on recognized keywords in the input speech. Depending on the current mode at 510, the method proceeds to 512 if in an insertion mode as with the present example. Thus, a speech input of "Yellow Submarine" would produce several speech recognition hypotheses that would be compared, at 512, to grammar indices of files not in the play list.

If good matches are found as at 514, then the best matching media files are reordered at 515 and automatically added to the play list at 516. If good matches are not found at 514, then the user may be prompted at 518 with alternative search and/or selection suggestions. Alternatively, in the event of plural files, the user may be asked to select one of the displayed or recited files using manual or voice input.

With the play list at least partially developed at 516, the method proceeds to 520, wherein the user specifies a new mode. For example, the user can specify a non-selection mode by choosing to save the play list and/or play the play list, in which case the method ends at 522. Also, if the user wishes to add more songs to the play list, then the user can specify the insertion mode and proceed to 504. Further, if the user wishes to remove one or more media files from the play list, then the user can specify a deletion mode and proceed to 524. Thereafter, an input speech received at 506 and recognized at 508 is compared to grammar indices of files in the play list at 526. If good matches are found at 428, the matched media files are removed from the list at 530. If not, then the user can be prompted with suggestions for alternative searches and or selections. With the play list edited at 530, the user can specify a new mode and either continue to develop the play list or enter a non-selection mode.

Different types of selection modes can be entered in different situations according to the present invention. For example, consider the case where a user has already created a play list entitled "My Favorites" and is in the midst of listening to a temporary play list. The user can state, "Add the current selection to My Favorite Sad Songs." In this way, the corresponding play list can be edited based on selection of a song that is already playing. The same can occur if the user is listening to a song not previously selected according to the present invention, but merely randomly selected. Further, a user in the course of building or editing a play list can spontaneously choose to add one or more selected songs to another, existing play list. Thus, other and additional modes of selection are accommodated by the present invention.

The method of selecting media files according to the present invention has further applications in addition to generating a play list. For example, users can browse available streaming media on the computer network and select from a plurality of differently priced selections of the same song from various providers. Also, final selection can be implemented with manual input, so that a mixed-mode operation is employed. Further to mixed-mode operation, manual input can be used to browse play lists and/or one or more indices of available songs, with final selection being implemented by voice. Finally, it should be understood that the description of the invention is merely exemplary in nature and, thus, variations that do not depart from the gist of the invention are intended to be within the scope of the invention.

What is claimed is:

1. An embedded device for playing media files and generating a play list of media files based on input speech from a user, comprising:

an indexer generating a plurality of speech recognition grammars, including at least one of:

(a) a first indexer generating a first speech recognition grammar based on parsed contents of a media file header of the media file; and (b) a second indexer generating a second speech recognition grammar based on parsed categories in a file path for retrieving the media file to a user location;

a speech recognizer receiving an input speech from a user while in a selection mode; and a media file selector comparing the input speech received while in the selection mode to the plurality of speech recognition grammars, thereby selecting the media file.

2. The device of claim 1, wherein said indexer generating the plurality of speech recognition grammars includes the first indexer generating the first speech recognition grammar based on contents of the media file header of the media file.

3. The device of claim 2, wherein said indexer generating the plurality of speech recognition grammars includes the second indexer generating the second speech recognition grammar based on categories in the file path for retrieving the media file from the user location.

4. The device of claim 1, wherein said indexer generating the plurality of speech recognition grammars includes the second indexer generating the second speech recognition grammar based on categories in the file path for retrieving the media file from the user location.

5. The device of claim 1, wherein the media file contains speech, and said indexer generating the plurality of speech recognition grammars includes a third indexer recognizing speech within the media file and generating a third speech recognition grammar based on the recognized speech within the media file.

6. The device of claim 1, wherein said speech recognizer receives an input speech from the user while in a non-selection mode, wherein said indexer generates a classification based on the input speech received while in the non-selection mode, and wherein said indexer includes a fourth indexer generating a fourth speech recognition grammar based on the generated classification.

7. The device of claim 1, wherein said indexer includes a fifth indexer generating a fifth speech recognition grammar based on supplemental descriptive text associated with the media file and provided in a data store on a computer network.

8. The device of claim 1 comprising:
a data link receiving the media file over a computer network; and
a data store storing the received media file in association with the plurality of speech recognition grammars.

9. The device of claim 1 comprising a play list generator operable to add the media file to the play list upon selection of the media file while in an insertion mode.

10. The device of claim 1 comprising a play list generator operable to remove the media file from a play list upon selection of the media file while in a deletion mode.

11. The device of claim 1, wherein said indexer is adapted to parse headers of media files obtained over a computer network and parse file paths leading to the media files over the computer network by obtaining descriptive text from the headers and file paths.

12. The device of claim 11, wherein said indexer is adapted to generate speech recognition grammar indices based on the descriptive text, and to index media files according to the speech recognition grammar indices.

13. The device of claim 12, wherein said indexer is adapted to generate a field type and associate the field type with the speech recognition grammar indices.

14. The device of claim 13, wherein said media file selector is adapted to generate a search string based on recognition in the input speech of predefined keywords for Boolean operators and field types, the search string including one or more slots for receiving search terms corresponding to words in the input speech not recognized as one of said predefined keywords.

15. The device of claim 14, further comprising a play list manager having a playlist generation mode and a playlist edit mode supporting insertion and deletion of media files by voice in a previously generated playlist by targeted application of said media file selector inclusive or exclusive of playlist contents in a mode governed fashion.

16. The device of claim 12, wherein said indexer is adapted to filter the descriptive text by discarding words of relatively low value and expanding words of relatively high value.

17. The device of claim 12, wherein said indexer is adapted to generate a list of key words based on the descriptive text, to convert the keywords to phoneme strings using letter to sound rules, and to generate speech recognition grammar indices by concatenating the phoneme strings.

18. A method of selecting a media file using input speech, comprising:
generating a plurality of speech recognition grammars, including at least one of:
(a) generating a first speech recognition grammar based on parsed contents of a media file header of the media file; and
(b) generating a second speech recognition grammar based on parsed categories in a file path for retrieving the media file to a user location;
receiving an input speech from a user while in a selection mode; and
comparing the input speech received while in the selection mode to the plurality of speech recognition grammars, thereby selecting the media file.

19. The method of claim 18 wherein said generating a plurality of speech recognition grammars includes generating a first speech recognition grammar based on contents of the media file header of the media file.

20. The method of claim 19, wherein said generating a plurality of speech recognition grammars includes generating a second speech recognition grammar based on categories in a file path for retrieving the media file from a user location.

21. The method of claim 18, wherein said generating a plurality of speech recognition grammars includes generating a second speech recognition grammar based on categories in a file path for retrieving the media file from a user location.

22. The method of claim 18, wherein the media file contains speech, the method comprising recognizing speech within the media file, wherein said generating a plurality of speech recognition grammars includes generating a third speech recognition grammar based on the recognized speech within the media file.

23. The method of claim 18 comprising:
receiving an input speech from the user while in a non-selection mode;
generating a classification based on the input speech received while in the non-selection mode; and
associating the generated classification with the media file,
wherein said generating a plurality of speech recognition grammars includes generating a fourth speech recognition grammar based on the classification associated with the media file.

24. The method of claim 18, comprising generating a fifth speech recognition grammar based on supplemental descriptive text associated with the media file and provided in a data store on a computer network.

25. The method of claim 18 comprising:
receiving the media file over a computer network; and
storing the received media file in a data store in association with the plurality of speech recognition grammars.

26. The method of claim 18 comprising:
entering an insertion mode; and
adding the media file to a play list upon selection of the media file while in the insertion mode.

27. The method of claim 18 comprising:
entering a deletion mode; and
removing the media file from a play list upon selection of the media file while in the deletion mode.

28. The method of claim 18, further comprising parsing headers of media files obtained over a computer network and parsing file paths leading to the media files over the computer network by obtaining descriptive text from the headers and file paths.

29. The method of claim 28, further comprising:
generating speech recognition grammar indices based on the descriptive text; and
indexing media files according to the speech recognition grammar indices.

30. The method of claim 29, further comprising:
generating a field type; and
associating the field type with the speech recognition grammar indices.

31. The method of claim 30, further comprising generating a search string based on recognition in the input speech of predefined keywords for Boolean operators and field types, the search string including one or more slots for receiving search terms corresponding to words in the input speech not recognized as one of said predefined keywords.

32. The method of claim 31, further comprising:

switching between a playlist generation mode and a playlist edit mode supporting insertion and deletion of media files by voice in a previously generated playlist;

deleting and editing media files by targeted selection of media files inclusive or exclusive of playlist contents in a mode governed fashion.

33. The method of claim 29, further comprising filtering the descriptive text by discarding words of relatively low value and expanding words of relatively high value.

34. The method of claim 29, further comprising:

generating a list of key words based on the descriptive text;

converting the keywords to phoneme strings using letter to sound rules; and generating speech recognition grammar indices by concatenating the phoneme strings.

* * * * *